(12) United States Patent
Louie et al.

(10) Patent No.: US 9,588,857 B2
(45) Date of Patent: Mar. 7, 2017

(54) RAID LOGICAL STRIPE BACKUP TO NON-VOLATILE MEMORY IN RESPONSE TO RAID STORAGE DEVICE MEDIA ERRORS

(71) Applicant: Lenovo Enterprise Solutions (Singapore) PTE. LTD., New Tech Park (SG)

(72) Inventors: Timothy J. Louie, Apex, NC (US); Ernest N. Mandese, Durham, NC (US); Joaquin F. Pacheco, Cary, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 123 days.

(21) Appl. No.: 14/746,375

(22) Filed: Jun. 22, 2015

(65) Prior Publication Data

US 2016/0371161 A1    Dec. 22, 2016

(51) Int. Cl.
*G06F 11/00* (2006.01)
*G06F 11/20* (2006.01)
*G06F 11/16* (2006.01)
*G06F 3/06* (2006.01)

(52) U.S. Cl.
CPC ........ *G06F 11/2094* (2013.01); *G06F 3/0619* (2013.01); *G06F 3/0647* (2013.01); *G06F 3/0689* (2013.01); *G06F 11/1662* (2013.01); *G06F 11/1666* (2013.01); *G06F 2201/85* (2013.01)

(58) Field of Classification Search
CPC .... G06F 3/0619; G06F 3/0647; G06F 3/0689; G06F 11/1662; G06F 11/1666; G06F 11/2094; G06F 2201/85
See application file for complete search history.

(56) References Cited

U.S. PATENT DOCUMENTS 7,941,696 B2 * 5/2011 Frost ................... G06F 11/1068
714/6.2
8,375,187 B1 * 2/2013 Chilton .................. G06F 13/00
711/114

(Continued)

OTHER PUBLICATIONS

Harris, R., "Flash cache for RAID", ZDNet, online <http://www.zdnet.com/article/flash-cache-for-raid/>, Aug. 11, 2010, 10 pp.

(Continued)

*Primary Examiner* — Joshua P Lottich
(74) *Attorney, Agent, or Firm* — Charles Bustamante (57) ABSTRACT

When a media error occurs on a storage device of a number of storage devices of a redundant array, the logical stripe of data affected by the media error is determined. A portion of non-volatile memory is reserved and the logical stripe is backed up to this portion of non-volatile memory. A read request is subsequently serviced from the non-volatile memory and not from the storage devices. When a write request is received, it is first serviced to the storage devices. If successful, then the previously reserved portion of non-volatile memory is freed up, and subsequent requests are serviced using the storage devices. If unsuccessful, then the write request is serviced using the non-volatile memory.

20 Claims, 3 Drawing Sheets

(56) References Cited

U.S. PATENT DOCUMENTS

| | | | | |
|---|---|---|---|---|
| 2003/0115414 | A1* | 6/2003 | Tomita | G06F 11/1458 |
| | | | | 711/114 |
| 2007/0028045 | A1* | 2/2007 | Hung | G06F 3/0613 |
| | | | | 711/114 |
| 2010/0325522 | A1* | 12/2010 | Tsukamoto | G06F 11/108 |
| | | | | 714/770 |
| 2012/0284587 | A1* | 11/2012 | Yu | G06F 3/0608 |
| | | | | 714/773 |
| 2015/0052393 | A1* | 2/2015 | Palmer | G06F 12/0246 |
| | | | | 714/15 |
| 2015/0317210 | A1* | 11/2015 | Palmer | G06F 11/1441 |
| | | | | 714/6.3 |
| 2016/0019114 | A1* | 1/2016 | Han | G06F 11/1076 |
| | | | | 714/764 |
| 2016/0034186 | A1* | 2/2016 | Weiner | G06F 3/061 |
| | | | | 710/74 |
| 2016/0170850 | A1* | 6/2016 | Williams | G06F 11/2069 |
| | | | | 714/6.23 |
| 2016/0217040 | A1* | 7/2016 | Jin | G06F 11/1088 |
| 2016/0342465 | A1* | 11/2016 | Cudak | G06F 11/1068 |
| 2016/0350015 | A1* | 12/2016 | Luo | G06F 3/0619 |

OTHER PUBLICATIONS

Lynn, B. et al., "Non-Volatile CACHE for Host-Based RAID Controllers", A Dell Technical White Paper, Jan. 2011, 14 pp.
Crump, G., "Server Side Caching vs. Raid Controller Caching", online <http://www.storage-switzerland.com/Articles/Entries/2013/7/8_. . . >Jul. 8, 2013, 4 pp.
Webster, J., "The end of battery-backed cache?", CNET, online <http://www.cnet.com/news/the-end-of-battery-backed-cache/> Jun. 26, 2009, 4 pp.

* cited by examiner

FIG 3

RAID LOGICAL STRIPE BACKUP TO NON-VOLATILE MEMORY IN RESPONSE TO RAID STORAGE DEVICE MEDIA ERRORS

BACKGROUND

Data is the lifeblood of many individual users as well as entities like businesses and governmental organizations. Many people generate data using computing devices, in the course of their jobs or their personal lives. Furthermore, the computing devices themselves, as well as other devices, may generate data as well. These and other types of data are typically stored on storage devices, like hard disk drives and other types of storage devices. While such storage devices have become increasingly more reliable, they can and do fail.

SUMMARY OF THE INVENTION

An example non-transitory computer-readable data storage medium stores computer-executable code that is executed by a redundant array of independent drives (RAID) controller to perform a method. The method includes, in response to determining that a media error has occurred on a storage device of a number of storage devices configured in a RAID array, determining a logical stripe of data of the RAID array affected by the media error. The method includes, after determining the logical stripe of data affected by the media error, reserving a portion of non-volatile memory and backing up the logical stripe of data to the portion of non-volatile memory. The method includes, in response to receiving a read request for the data of the logical stripe, servicing the read request from the non-volatile memory and not from the storage devices configured in the RAID array.

An example RAID controller for a RAID array of a number of storage devices includes a processor, a non-volatile memory, and a non-transitory computer-readable data storage medium storing computer-executable code that is executable by the processor. The code is executable by the processor to determine a logical stripe of data affected by a media error that has occurred on a storage device of the storage devices of the RAID array. The code is executable by the processor to reserve a portion of the non-volatile memory, and back up the logical stripe of data to the portion of the non-volatile memory. The code is executable by the processor to service a read request for the data of the logical stripe from the non-volatile memory and not from the storage devices of the RAID array.

An example system includes storage devices configured in a redundant array, a non-volatile memory, and a controller. The controller is to determine a logical stripe of data affected by a media error that has occurred on a storage device of the storage devices configured in the redundant array. The controller is to reserve a portion of the non-volatile memory, and back up the logical stripe of data to the portion of the non-volatile memory. The controller is to service a read request for the data of the logical stripe from the non-volatile memory and not from the storage devices configured in the redundant array.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, although storage devices have become more reliable, they do occasionally fail. To guard against data loss, storage devices may be configured in a redundant array, such as in a redundant array of independent disks (RAID configuration). In most RAID types, data is written over each storage device of the array in such a way that if any device fails, the data itself is still recoverable. For example, in level 5 of RAID, a given block, or logical stripe, of data is written over all the storage devices except one, to which parity information for the drive is stored.

A disadvantage associated with most types of RAID is that once one storage device fails, the failure of any additional storage device results in total failure of the array and irreplaceability of the data stored in the array. This disadvantage extends to limited storage device failures as well. For example, a media error on a storage device like a hard disk drive may affect just a portion of the storage device on which one logical stripe of data is stored; other parts of the storage device are unaffected by such a media error. If another media error occurs on a different storage device affecting the same data stripe, or if this other device completely fails, the data will become irretrievably lost in the array. This is particularly problematic where the data of the stripe in question is critical, such as when the data is part of the operating system by which a computing device including or connected to the array is operable.

Disclosed herein are techniques that alleviate the disadvantages of RAID associated with the limited storage device failures noted above. When a media error occurs on one storage device, the affected logical stripe of data is backed up to non-volatile memory. As such, if a media error occurs on another storage device affecting the same logical stripe, or if this other storage device completely fails, no data loss occurs. A subsequent read request for this logical stripe is serviced from the non-volatile memory and not from the array of storage devices.

A subsequent write request to the logical stripe of data, by comparison, is first attempted to be serviced by the array of storage devices and not by the non-volatile memory. This is because storage devices typically have a low-level "self-healing" capability in which a bad storage unit, such as a physical disk sector or block in the case of a magnetic hard disk drive, can be marked as such and replaced by a replacement unit of which a storage device has a limited number. If servicing of the write request to the array succeeds, then the non-volatile memory reserved for backing up the logical stripe of data is freed up. However, if servicing of the write request to the array fails, then the write request is made to the non-volatile memory, and future requests are made to the non-volatile memory as well.

Figure 1:
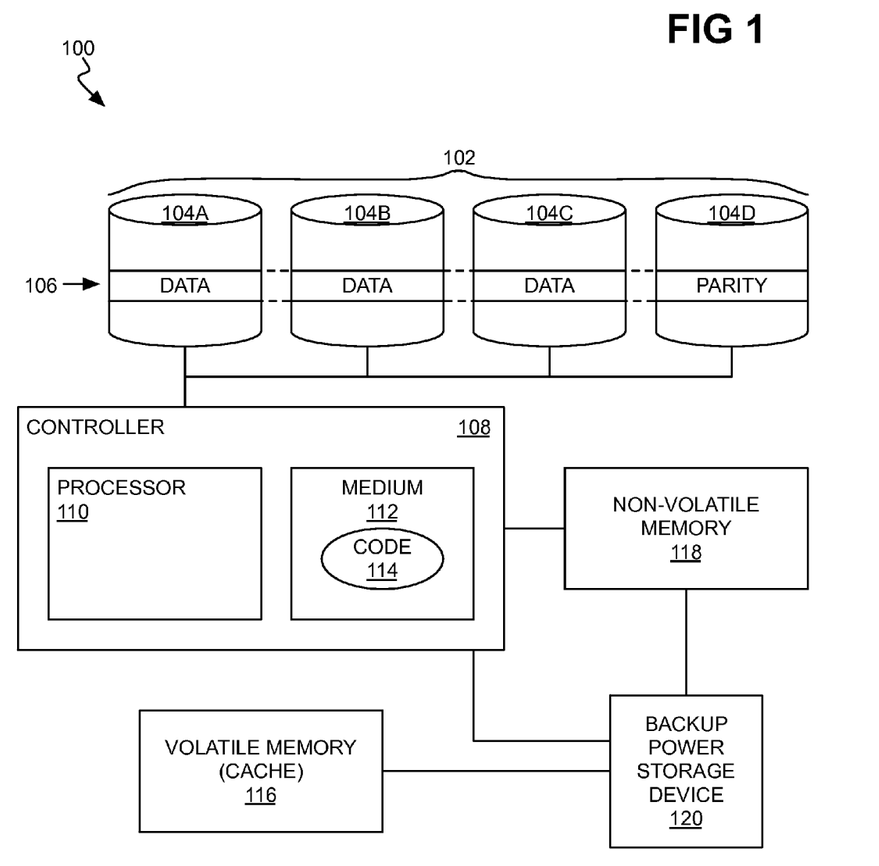
FIG. 1 is a diagram of an example system including storage devices organized in a redundant array of independent disks (RAID) configuration, and a RAID controller.

FIG. 1 shows an example system 100. The system 100 includes a redundant array 102, such as a RAID array, of storage devices 104A, 104B, 104C, and 104D, which are collectively referred to as the storage devices 104. Four storage devices 104 are depicted in FIG. 1 as an example, but in general there are at least two storage devices 104. The storage devices 104 may be magnetic storage devices, for instance, such as hard disk drives.

The storage devices 104 are thus configured in the redundant array 102. One example of such a redundant array 102 that is particularly depicted in FIG. 1 is a level 5 RAID array. Data is written over the storage devices 104 within logical data stripes, such as the logical data stripe 106. The storage devices 104A, 104B, and 104C store a portion of the data, and the storage device 104D stores parity information for this data. Therefore, if any storage device 104 fails, the data is still retrievable within the array 102. Other types of RAID arrays suitable for usage with the techniques disclosed herein include RAID levels 1, 10, 5, 50, and 6, among others.

The system 100 includes a RAID controller 108 that exposes the physical storage devices 104 to a computing device like a desktop, laptop, or server computer as a single logical storage device. The controller 108 therefore handles data write requests to the redundant array 102 and data read requests from the array 102. The controller 108 includes a processor 110 and a non-transitory computer-readable data storage medium 112 storing computer-executable code 114 that the processor 110 executes. The processor 110 and the medium 112 may be discrete physical components, such as if the processor 110 is a general-purpose processor. The processor 110 and the medium 112 may also be integrated within a single physical component, such as an application-specific integrated circuit (ASIC), a field-programmable gate array (FPGA), and so on.

The system 100 can include volatile memory 116 that serves as a cache for the array 102. The volatile memory 116 may be part of the controller 108 in one implementation, and may be semiconductor dynamic random-access memory (DRAM). The array 102 may be configured to use the cache in one of at least two configurations or modes: write-back and write-through. In write-back mode, the controller 108 immediately sends acknowledgements to write requests to the requesting devices upon writing the data in question to the volatile memory 116, even before the data has been written to the storage devices 104 of the array 102. In write-through mode, the controller 108 does not send acknowledgements to write requests to the requesting devices until the data has been successfully written to the storage devices 104.

The system 100 includes non-volatile memory 118, which may be part of the controller 108 in one implementation. The non-volatile memory 118 may be negative-AND (NAND) semiconductor flash memory, magnetoresistive random-access memory (MRAM), or another type of non-volatile memory. The non-volatile memory 118 can serve to back up the volatile memory 116 when primary power to the system 100, such as alternating current (AC) mains power or uninterruptible power supply (UPS) power, has been lost. Such backup is important when the array 102 is operating in write-back mode, because acknowledgements to write requests are sent even though the data has just been written to the cache and not yet to the storage devices 104 of the array 102.

The system 100 can include a backup power storage device 120 in this respect, which may be part of the controller 108 in one implementation. The power storage device 120 provides power for a length of time sufficient to power the controller 108, the volatile memory 116, and the non-volatile memory 118 for the controller 108 to back up the volatile memory 116 to the non-volatile memory 118, and ideally to then gracefully shut down. The power storage device 120 may be a small rechargeable or non-rechargeable battery, which in the former instance is recharged when primary power is applied to the system 100. The power storage device 120 may be a so-called super capacitor that is similarly charged by primary power applied to the system 100.

As described below, the controller 108 backs up logical data stripes like the data stripe 106 to the non-volatile memory 118 when media errors occur on the storage devices 104 that affect the logical stripes. In this respect, when the non-volatile memory 118 also serves as backup for the volatile memory 116, there may be more non-volatile memory 118 than is needed for such backup, in which case the remainder can be reserved for backing up logical stripes. In one implementation, however, the non-volatile memory 118 is just for backing up logical stripes. In this implementation, the volatile memory 116 may not be backed up (in which case there may not be a backup power storage device 120), or the system 100 may include a different non-volatile memory for the purpose of backing up the volatile memory 116.

Figure 2:
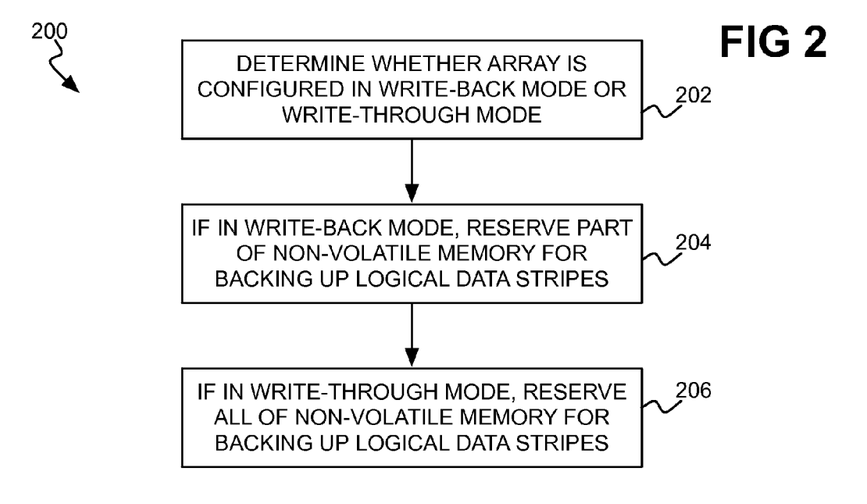
FIG. 2 is a flowchart of an example method for configuring non-volatile memory to back up logical stripes of data responsive to media errors occurring on storage devices of a redundant array.

FIG. 2 shows an example method 200 that the controller 108 can perform. The controller 108 performs the method 200 when the non-volatile memory 118 can serve as backup for the volatile memory 116, in addition to being used to back up logical data stripes. The controller 108 determines whether the redundant array 102 is configured in write-back mode or in write-through mode (202). If the array 102 has been configured to operate in write-back mode, then just a part of the non-volatile memory 118 is set aside for backing up logical data stripes (204). The non-reserved part is sufficient to back up the volatile memory 116 if needed. Stated another way, any excess storage capacity of the non-volatile memory 118 above that which is needed to back up the volatile memory 116 is set aside and used for backing up logical data stripes.

By comparison, if the array 102 has been configured to operate in write-through mode, then all of the non-volatile memory 118 may be set aside for backing up logical data stripes (206). This is because in write-through mode, maintaining the contents of the non-volatile memory 118 when primary power loss occurs may not be important. Specifically, because acknowledgements to write requests are not sent to the requesting devices until the data has been written to the storage devices 104 of the array 102 itself, this means that in the case of primary power loss, the requesting devices know that any write requests to which they have not received acknowledgements have not been properly written to the array 102. By comparison, in write-back loop mode, if the volatile memory 116 is not backed up when primary power loss occurs, some data in the cache may not have been written to the storage devices 104 of the array 102, even though the requesting devices received acknowledgements to their write requests.

Figure 3:
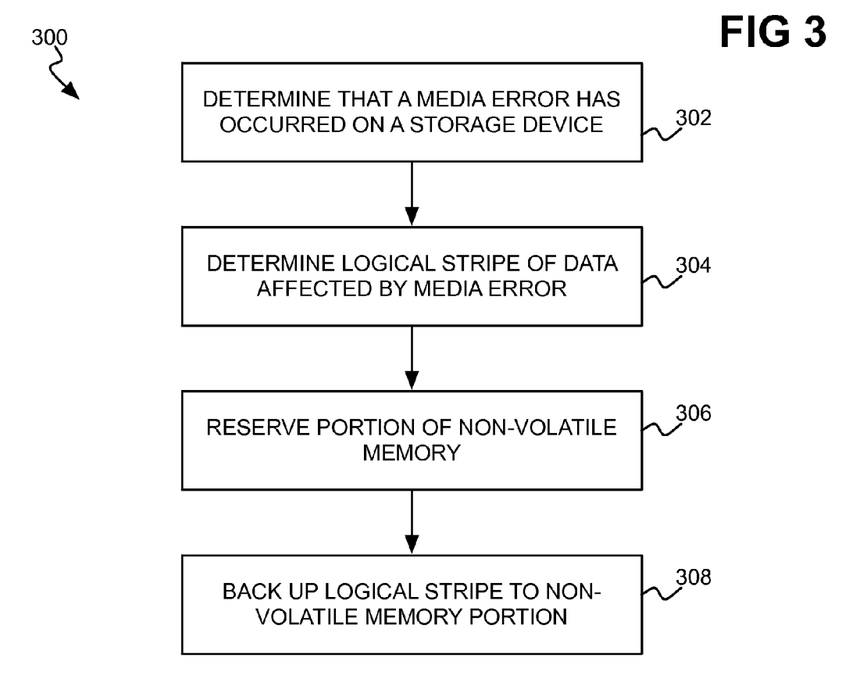
FIG. 3 is a flowchart of an example method for backing up a logical data stripe to non-volatile memory responsive to a media error occurring on a storage device of a redundant array.

FIG. 3 shows an example method 300 that the controller 108 performs when a media error has occurred on a storage device 104 of the array 102. The controller 108 determines that such a media error has occurred (302). For example, the storage device 104 may report to the controller 108 that the media error occurred. The media error of part 302 may be an immediately unrecoverable media error. Such an immediately unrecoverable media error can be a media error that occurs in a storage device 104 whose own internal controller does not have the capability to remap, reallocate, or reassign the affected unit or block to a good unit or block. Such an immediately unrecoverable media error can be a media error that the storage device 104's own internal controller was unable to remap, reallocate, or reassign the affected unit or block to a good unit, or block, of the device 104, even when the storage device 104 has such capability.

In general, a media error for a magnetic hard disk drive may be a defect, bad spot, or a damaged area on the disk surface that cannot reliably store data. Even brand new hard disk drives have media errors "out of the box," and as much as two percent (or more) of a hard disk drive's quoted capacity may be spare units or blocks to replace units or blocks that have media errors. The internal controllers of hard disk drives may themselves be able to remap, reallocate, or reassign good blocks for bad blocks, or they may leave this capability for the controller 108 to perform.

In response to determining that a media error has occurred, the controller 108 determines the logical stripe of data affected by the media error (304). The media error is not catastrophic to the storage device 104 on which it has occurred. That is, the storage device 104 is still able to write and read data, just not to the logical stripe of data affected by the media error in question. In this respect, a media error differs from a complete failure of the storage device 104 itself, in which no data is able to be written to or read from the device 104, for instance. The controller 108 may determine the affected logical stripe of data by referencing a lookup table that the controller 108 maintains and which maps logical stripes to locations (i.e., units or blocks) on the storage devices 104. Thus, when a storage device 104 reports that it has an immediately unrecoverable media error at a particular unit or block, the controller 108 references this table to identify the logical stripe of data that is partially stored on that unit or block (including if the storage device 104 is storing parity information for the logical stripe).

The controller 108 then reserves a portion of the non-volatile memory 118 to back up the logical stripe of data (306). In this case, it is assumed that there is sufficient non-volatile memory 118 that has not been reserved for backing up other logical stripes of data to back up the logical stripe in question. If there is not, then a notification may be sent to an administrator of the system 100 that any further media errors affecting the logical stripe will result in the data of the stripe being irretrievably lost within the array 102.

The controller 108 ultimately backs up the logical stripe to the reserved portion of the non-volatile memory 118 (308). At least the data of the logical stripe is completely backed up to the non-volatile memory 118, and the parity information may or may not be backed up. That is, not just the portion of the logical stripe that the storage device 104 on which the media error occurred is backed up. This is so that the backup of the logical stripe on the non-volatile memory 118 can be used to completely service read and write requests pertaining to the logic stripe, without relying on any storage device 104 of the array 102.

Figure 4:
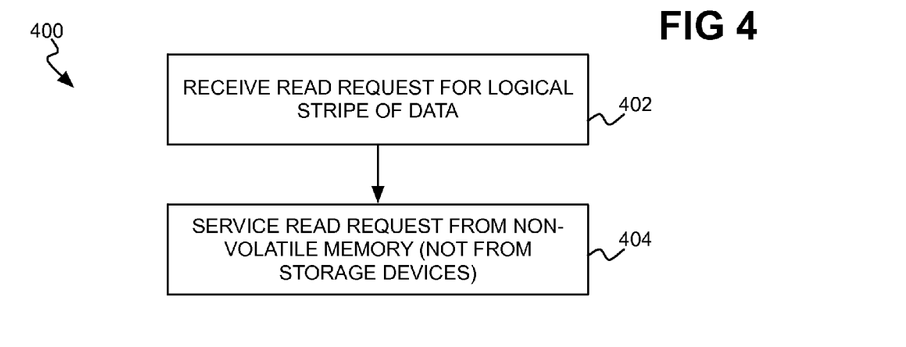
FIG. 4 is a flowchart of an example method for reading a logical data stripe that is currently being backed up to non-volatile memory.

FIG. 4 shows an example method 400 that the controller 108 performs to service a read request from a requesting device. The method 400 is performed for any data that is stored in a logical stripe that is currently being backed up to the non-volatile memory 118. If the logical stripe in question is not currently being backed up to the non-volatile memory 118, then data retrieval occurs directly from the redundant array 102 of storage devices 104. Furthermore, as described below, in some cases a logical stripe may be backed up to the non-volatile memory 118, and then no longer be backed up if the unit or block affected media error was subsequently successfully remapped, reassigned, or reallocated to a good or functioning unit or block.

The controller 108 thus receives a request read for a logical stripe of data that is currently being backed up to the non-volatile memory 118 (402). In response, the controller 108 services the read request just from the non-volatile memory 118 (404), and not from any storage device 104 of the array 102. Servicing the read request means reading the data from the non-volatile memory 118, and returning the read data in a response to the requesting device.

Figure 5:
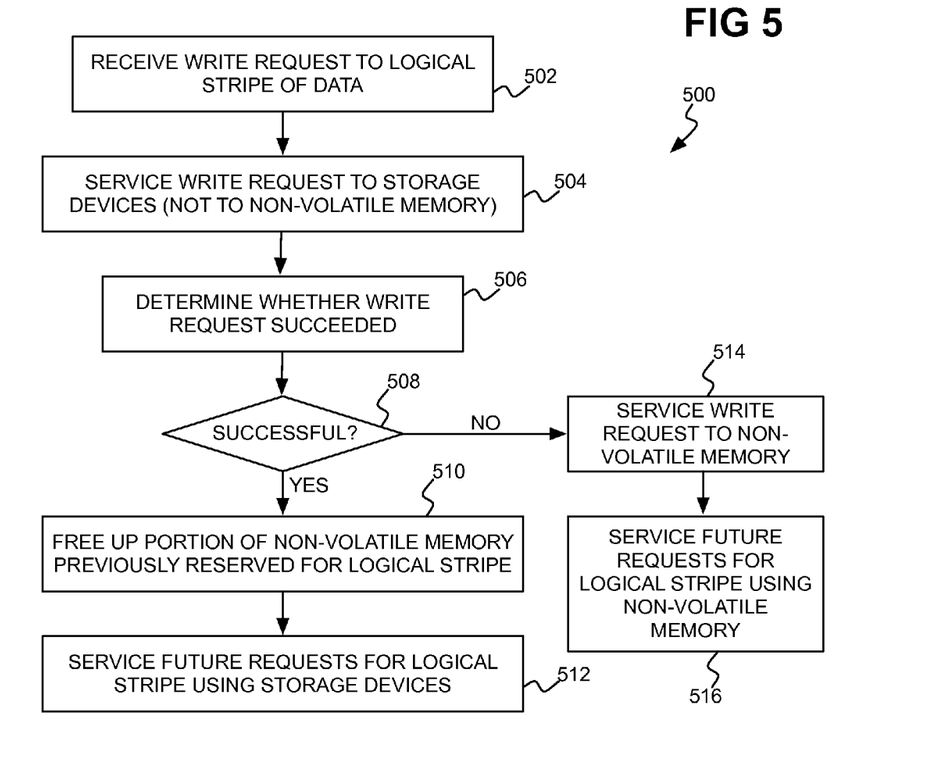
FIG. 5 is a flowchart of an example method for writing a logical data stripe the first time that a write request is received after the logical stripe has been backed up to non-volatile memory.

FIG. 5 shows an example method 500 that the controller 108 performs to service a write request from a requesting device. The method 500 is performed for any data that is to be written to a logical stripe the first time after the logical stripe has been backed up to the non-volatile memory 118. The reason why this is the case is described later in the description of FIG. 5.

The controller 108 thus receives the first write request for a logical stripe of data after the logical stripe has been most recently been backed up to the non-volatile memory 118 (502). Even though the logical stripe has been backed up to the non-volatile memory 118, the controller 108 attempts to service the write request to the storage devices 104 of the array 102 (504). That is, the controller 108 attempts to write the data of the request to the storage devices 104, and does not write the data to the non-volatile memory 118 on which the logical stripe has been backed up, in part 504.

This is because the unit or block affected by the media error may be remapped, reassigned, or reallocated to a good or functioning unit or block by either the controller 108 or the internal controller of the storage device 104 having the media error at the time of data writing. Therefore, rather than immediately assume that the media error is catastrophic and unrecoverable, the controller 108 tries first to see if the error is recoverable by being remapped, reassigned, or reallocated to a good or functioning unit or block of the storage device. As such, after servicing the write request using the storage devices 104, the controller 108 determines whether such servicing was successful (506). For instance, the storage devices 104 may each report back that they were able to successfully write the data in question (i.e., a portion of the data of the write request, or parity information for this data that the controller 108 itself generated).

If the write request to the storage devices 104 of the array 102 was successful (508), then the controller 108 frees up the portion of the non-volatile memory 118 previously reserved for the logical stripe (510). This portion of the non-volatile memory 118 can then be used for backing up other logical stripes. Further, future requests for the logical stripe of data—including read and write requests—are serviced using the storage devices 104, and not the non-volatile memory 118, since no portion of the memory 118 is reserved for the logical stripe. However, if another media error occurs on the same or different storage device 104 that affects the logical stripe, then the method 300—and thus the method 500—may again be performed.

If the write request to the storage devices 104 of the array 102 was unsuccessful (508) though, then the controller 108 services the write request to the portion of the non-volatile memory 118 to which the logical stripe has been backed up (514). That is, the data of the write request is written to the non-volatile memory 118 by the controller 108. Furthermore, future requests for the logical stripe in question—including read and write requests—are serviced using the non-volatile memory 118 and not the storage devices 104 of the array 102 (516). That is, as noted above, the method 500 is performed just the first time a write request is received for a logical stripe after the logical stripe has been backed up to the non-volatile memory 118.

The method 500 is performed just the first time a write request is received for a logical stripe after it has been most recently backed up to the non-volatile memory 118 to ensure coherence of the logical stripe. The following example shows why this is the case. Assume that the method 500 is instead performed every time a write request is received for a logical stripe that is being backed up to the non-volatile memory. For purposes of the example, the data to be written to the logical stripe is of the type "increment the current value by one." That is, the write request is more of an update-type write request as opposed to a write request that specifies the actual data to be written, where the terminology "write request" encompasses such an update request.

Now, the logical stripe as originally stored in the array 102 and as backed up on the non-volatile memory 118 may have the value of 5. If the first time the method 500 were performed in this example the write request to the storage devices 104 failed in part 504, then the value stored in the non-volatile memory 118 would be incremented to 6 in part 514. If the second time the method 500 were performed in this example the write request to the storage devices 104 succeeded in part 506, the value stored in the array 102 itself would be incremented to 6.

However, the value should be 7, because the original value of 5 has been incremented twice. To ensure that this error does not occur—i.e., to maintain coherence of the logical stripe—once data has been written to the non-volatile memory 118 for a logical stripe, all future requests are serviced using the non-volatile memory 118 for this stripe. The method 500 can be performed the first time a write request is received after a logical stripe has been backed up from the array 102 to the non-volatile memory 118 because at that time both the non-volatile memory 118 and the array 102 store the same data for the stripe.

The techniques disclosed herein thus heighten the reliability of redundant arrays of storage devices. Normally, when a media error occurs on a storage device of a redundant array, the logical stripe of data affected by the media error no longer has redundancy: if another media error occurs on a different storage device of the array that affects the same logical stripe of data, the data is no longer retrievable. By comparison, in the techniques disclosed herein, the data is still retrievable, because it has been backed up to non-volatile memory. Further, functioning of the array is not affected, because the logical stripe is backed up to non-volatile memory while the array is online; the array does not have to be taken offline to perform the backup, and instead requests can continue to be serviced as if the media error did not occur.

The techniques disclosed herein can also be employed without having to add physical hardware to a redundant array. So long as there is non-volatile memory for the array, and so long as there is more non-volatile memory than needed to backup the cache and/or so long as the array is not operating in write-back mode, the non-volatile memory can be leveraged for backing up logical stripes of data in real-time as media errors occur on the storage devices of the array. Thus, a controller may just have to be reprogrammed to utilize the techniques disclosed herein in the context of an existing redundant array.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A non-transitory computer-readable data storage medium storing computer-executable code that is executed by a redundant array of independent drives (RAID) controller to perform a method comprising:
　in response to determining that a media error has occurred on a storage device of a plurality of storage devices configured in a RAID array, determining a logical stripe of data of the RAID array affected by the media error;
　after determining the logical stripe of data affected by the media error, reserving a portion of non-volatile memory and backing up the logical stripe of data to the portion of non-volatile memory; and
　in response to receiving a read request for the data of the logical stripe, servicing the read request from the non-volatile memory and not from the storage devices configured in the RAID array.

2. The non-transitory computer-readable data storage medium of claim 1, wherein the method further comprises:
　in response to receiving a write request to the data of the logical stripe, servicing the write request to the storage devices configured in the RAID array; and
　in response to determining that servicing the write request to the storage devices was successful:
　　freeing up the portion of non-volatile memory that was previously reserved for backing up the logical stripe of data; and
　　servicing future requests for the data of the logical stripe, including future read requests, using the storage devices configured in the RAID array.

3. The non-transitory computer-readable data storage medium of claim 2, wherein the method further comprises:
　in response to determining that servicing the write request to the storage devices was unsuccessful:
　　servicing the write request to the non-volatile memory; and
　　servicing the future requests for the data of the logical stripe, including future write requests, using the non-volatile memory.

4. The non-transitory computer-readable data storage medium of claim 1, wherein determining that the media error has occurred on the storage device comprises:
    receiving a notification from the storage device that the media error has occurred.

5. The non-transitory computer-readable data storage medium of claim 1, determining the logical stripe of data affected by the media array comprises:
    referencing a lookup table storing which logical stripes are stored at which locations on the storage devices.

6. The non-transitory computer-readable data storage medium of claim 1, wherein the non-volatile memory is provided to back up volatile memory serving as a cache to the RAID array when primary power loss occurs, wherein the method further comprises:
    in response to determining that the RAID array has been configured to operate in a write-back caching configuration in which the RAID controller returns write acknowledgements when data is stored in the cache and before the data is stored on the storage devices,
        reserve a part of the non-volatile memory for backing up logical stripes of data responsive to media errors occurring on the storage devices configured in the RAID array, another part of the non-volatile memory that remains unreserved sufficient in size to still back up the cache when primary power loss occurs.

7. The non-transitory computer-readable data storage medium of claim 1, wherein the non-volatile memory is provided to back up volatile memory serving as a cache to the RAID array when primary power loss occurs, wherein the method further comprises:
    in response to determining that the RAID array has been configured to operate in a write-though caching configuration in which the RAID controller returns write acknowledgements only after data is stored on the storage devices,
        reserve all of the non-volatile memory for backing up logical stripes of data responsive to media errors occurring on the storage devices configured in the RAID array.

8. The non-transitory computer-readable data storage medium of claim 1, wherein the non-volatile memory is not provided to back up volatile memory serving as a cache to the RAID array when primary power loss occurs, and is provided just to back up logical stripes of data responsive to media errors occurring on the storage devices configured in the RAID array.

9. The non-transitory computer-readable data storage medium of claim 1, wherein the non-volatile memory is negative AND (NAND) flash memory.

10. The non-transitory computer-readable data storage medium of claim 1, wherein the non-volatile memory is magnetoresistive random-access memory (MRAM).

11. A redundant array of independent drives (RAID) controller for a RAID array of a plurality of storage devices, comprising:
    a processor;
    a non-volatile memory; and
    a non-transitory computer-readable data storage medium storing computer-executable code that is executable by the processor to:
        determine a logical stripe of data affected by a media error that has occurred on a storage device of the storage devices of the RAID array;
        reserve a portion of the non-volatile memory;
        back up the logical stripe of data to the portion of the non-volatile memory; and
        service a read request for the data of the logical stripe from the non-volatile memory and not from the storage devices of the RAID array.

12. The RAID controller of claim 11, wherein the computer-executable code is further executable by the processor to:
    upon receiving a write request to the data of the logical stripe, service the write request to the storage devices of the RAID array;
    determine whether servicing the write request to the storage devices was successful; and
    in response to determining that servicing the write request to the storage devices was successful, free up the portion of non-volatile memory that was previously reserved for backing up the logical stripe of data.

13. The RAID controller of claim 12, wherein the computer-executable code is further executable by the processor to:
    in response to determining that servicing the write request to the storage devices was unsuccessful, service the write request to the non-volatile memory.

14. The RAID controller of claim 11, further comprising:
    volatile memory to cache the RAID array; and
    a power storage device that provides backup power to the RAID controller,
    wherein the non-volatile memory is to back up the volatile memory when primary power loss occurs, the power storage device providing the backup power for a length of time sufficient to back up the volatile memory when primary power loss occurs,
    and wherein the computer-executable code is further executable by the processor to:
        determine whether the RAID array has been configured to operate in a write-back caching configuration or a write-through caching configuration;
        in response to determining that the RAID array has been configured to operate in the write-back caching configuration, reserve a part of the non-volatile memory for backing up logical stripes of data responsive to media errors occurring on the storage devices of the RAID array, another part of the non-volatile memory that remains unreserved sufficient in size to still back up the volatile memory when primary power loss occurs.

15. The RAID controller of claim 14, wherein the computer-executable code is further executable by the processor to:
    in response to determining that the RAID array has been configured to operate in the write-though caching configuration,
        reserve all of the non-volatile memory for backing up the logical stripes of data responsive to media errors occurring on the storage devices of the RAID array.

16. A system comprising:
    a plurality of storage devices configured in a redundant array;
    a non-volatile memory;
    a controller to:
        determine a logical stripe of data affected by a media error that has occurred on a storage device of the storage devices configured in the redundant array;
        reserve a portion of the non-volatile memory;
        back up the logical stripe of data to the portion of the non-volatile memory; and
        service a read request for the data of the logical stripe from the non-volatile memory and not from the storage devices configured in the redundant array.

17. The system of claim 16, wherein the controller is further to:
upon receiving a write request to the data of the logical stripe, service the write request to the storage devices configured in the redundant array;
determine whether servicing the write request to the storage devices was successful; and
in response to determining that servicing the write request to the storage devices was successful, free up the portion of non-volatile memory that was previously reserved for backing up the logical stripe of data.

18. The system of claim 17, wherein the controller is further to:
in response to determining that servicing the write request to the storage devices was unsuccessful, service the write request to the non-volatile memory.

19. The system of claim 16, further comprising:
volatile memory to cache the redundant array; and
a power storage device that provides backup power,
wherein the non-volatile memory is to back up the volatile memory when primary power loss occurs, the power storage device providing the backup power for a length of time sufficient to back up the volatile memory when primary power loss occurs,
and wherein the controller is further to:
in response to determining that the redundant array has been configured to operate in a write-back caching configuration, reserve a part of the non-volatile memory for backing up logical stripes of data responsive to media errors occurring on the storage devices configured in the redundant array, another part of the non-volatile memory that remains unreserved sufficient in size to still back up the volatile memory when primary power loss occurs.

20. The system of claim 19, wherein the controller is further to:
in response to determining that the redundant array has been configured to operate in a write-though caching configuration,
reserve all of the non-volatile memory for backing up the logical stripes of data responsive to media errors occurring on the storage devices of the redundant array.

* * * * *